Figure 1A:
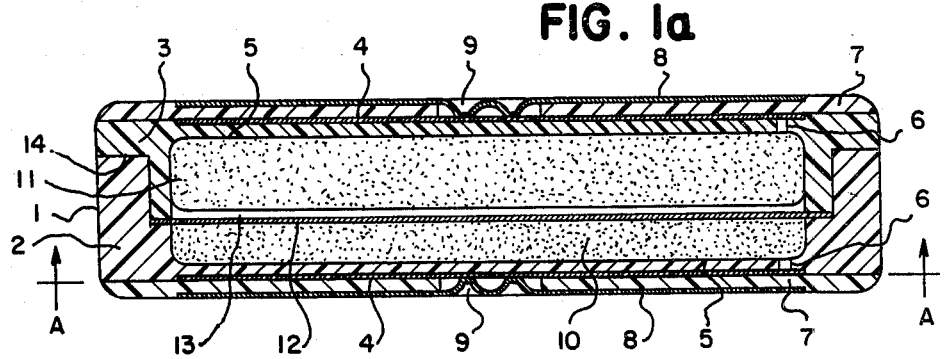

United States Patent [19]

Kühl

[11] 4,321,316
[45] Mar. 23, 1982

[54] TIGHTLY SEALED GALVANIC ELEMENT

[75] Inventor: Thomas Kühl, Eppstein, Fed. Rep. of Germany

[73] Assignee: Varta Batterie, Aktiengesellschaft, Hanover, Fed. Rep. of Germany

[21] Appl. No.: 182,487

[22] Filed: Aug. 29, 1980

[30] Foreign Application Priority Data

Jul. 18, 1980 [DE] Fed. Rep. of Germany ....... 2936857

[51] Int. Cl.³ .......................................... H01M 2/08
[52] U.S. Cl. .................................... 429/174; 429/178
[58] Field of Search ............... 429/174, 178, 181, 185

[56] References Cited

U.S. PATENT DOCUMENTS 3,834,945  9/1974  Jensen ........................... 429/181 X
4,265,984  5/1981  Kaye ................................. 429/178

*Primary Examiner*—Charles F. LeFevour
*Attorney, Agent, or Firm*—Weiser, Stapler & Spivak

[57] ABSTRACT

A galvanic element, particularly of the button-cell type with hermetically sealed housing of plastic, uses electrode take-off conductors for each polarity positioned in labyrinthine shape inside the housing wall which is formed of two firmly connected layers. The ends of each labyrinthine take-off conductor respectively contact a connector terminal on the inside and a connector terminal on the outside of the housing wall. This provides an exceptionally long creepage path for the hydroxide electrolyte.

6 Claims, 6 Drawing Figures

TIGHTLY SEALED GALVANIC ELEMENT

The invention relates to a galvanic element having a tightly closed housing which contains the electrodes, the separator and the electrolyte, and which is provided with contact terminals.

The housing of button cells, for example, consists of a cup which is also the container for the positive electrode, and a mating lid which contains the negative electrode. Lid and cup are fitted within each other and customarily insulated from each other by a plastic ring because the two housing portions simultaneously form the contact terminals of the element.

By crimping the cup rim against the lid edge, the plastic ring is deformed so that it conforms to the edge and the surface unevenness of the cup, and thereby is intended to provide a seal.

Over short periods of use, the insulating sealing of metal surfaces with a lye resistant plastic such as soft, high pressure polyethylene or polyamide, presents no problem because these plastics meet the requirements for high conformability. On the other hand, over longer periods of time, so-called cold flow causes them to yield under the pressure exerted by the adjoining surfaces and edges. As a consequence of the diminished compressive force, the initially hermetically sealed plastic/metal connection weakens, and the phase boundary surface becomes increasingly transparent to the electrolyte: it begins to creep. In particular, low button cells with correspondingly short creepage path are beset by this problem. In principle, however, it exists in all galvanic elements with housings which are sealed only mechanically.

For electric batteries which are used, for example, for wristwatches and electronic instruments, there exists currently the requirement for a minimum period of usage of five years. Button cells constructed in accordance with the conventional methods generally do not meet this requirement because they lose the electrolyte prematurely. In this, the loss of sealing is a function of the creepage velocity of the electrolyte. This creepage velocity, in turn, is influenced by several parameters, none of which can be varied at will in the desired sense. Among others, these parameters include the compressive force in the sealing region, the potential level, and the surface condition of the sealing members. Cells of other external configuration are basically similarly constructed.

Accordingly, it is an object of the present invention to provide a galvanic element with a completely insulating housing, whose electrical contacts, or current take-off connections are constructed in such manner that they inhibit electrolyte escape through the housing in the pass-through region.

This and other objects which will appear are accomplished in accordance with the invention by providing, for at least the electrode of one polarity, both an internal and an external connector terminal, and by interconnecting these two terminals electrically with each other by a labyrinthically shaped conductive path which is positioned within the housing wall made of insulating material.

The housing material is preferably plastic. When sodium or potassium hydroxide is the electrolyte, it may, for example, be the alkali resistant polyamide. It is particularly desirable to provide seamless welding between the two housing portions so that the electrochemical system is enclosed in hermetically and completely insulated manner.

Likewise, a hollow cylinder of plastic may be sealed at its open ends through welding on, or gluing on of a top and and bottom plate, or else a flat lid is welded to a housing cup.

In any case, however, at least one of the housing walls between the inner and outer connector terminals is composed of two layers which are firmly attached to each other by gluing, molding, welding, or pressing. The labyrinthine conductive path lies in the contact surface between these layers. From the ends of the conductive path, there penetrates respectively a connection through the inner layer of the housing wall to the interior connector terminal, and a connection through the outer layer of the housing wall to the external connector terminal. Alternatively, they may be connected electrically to the connector terminals in some other way.

The conductive path thus extends within the housing over a path length which is many times greater than the thickness of the housing wall. Since it is fully enclosed by the housing material, it provides a disproportionately long creepage path for the hydroxide electrolyte, and thereby also prevents its escape from the cell over a long period of time.

In accordance with the invention, the length of the conductive path should not create a significant increase in the internal resistance of the cell, as compared with the resistance values of know button cells. These exhibit typical resistances between 4 and 50 ohms. That the additional ohmic resistance of the take-off conductor labyrinth which is attributable to its length is insignificant can be easily be demonstrated mathematically.

The surface F of a cell with dimensions 7.9 mm diameter $\times 2.0$ mm height amounts to $F \approx 48$ mm$^2$. Half of this surface is to be covered inside the wall with the conductive path, in such a manner that the spaces between the portions of the conductive path are of the same width as the conductive path itself. The useful surface F/2 therefore amounts to 24 mm$^2$.

If the built-in conductive material is copper, with a layer thickness $s_L = 70$ $\mu = 70 \times 10^{-3}$ mm ($\rho_{copper} = 0.0252$ $\Omega^* $ mm$^2$/m) then, assuming a permissible conductive path resistances $R_L$ of given magnitude, the corresponding conductive path lengths are shown by the following table:

| Permissible added resistance ($\Omega$) | 0.1 | 0.2 | 0.5 | 1 | 2 |
|---|---|---|---|---|---|
| Conductive path length (cm) | 9 | 13 | 20 | 29 | 41 |

Thus, it is possible to provide a conductive path of 9 cm as the creepage path both in the lid and in the cup, while creating a negligible additional resistance of $2 \times 0.1$ ohms (cup+lid).

The electrolyte creepage generally affects the electrode take-off conductors unequally. For example, in an AgO/Zn cell, the zinc electrode take-off conductor is more strongly affected. Therefore, it is generally sufficient to provide a longer creepage path at that point, whereas the AgO electrode may be provided with a shorter creepage path.

Figure 1B:
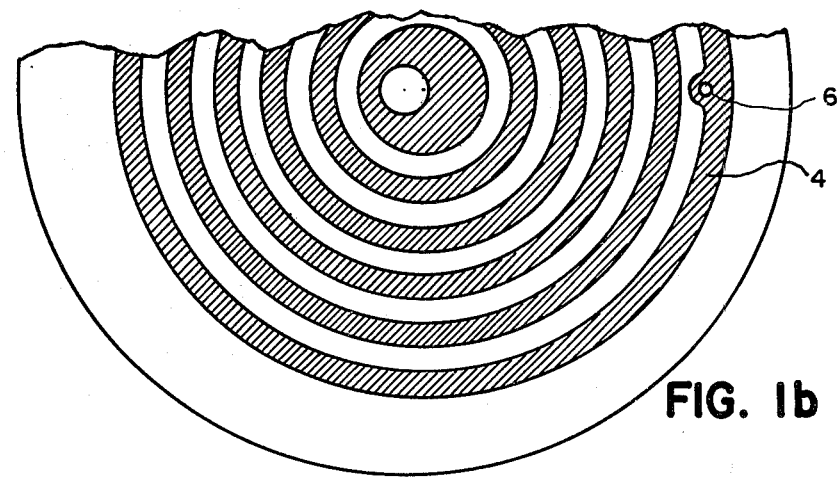
Figure 2A:
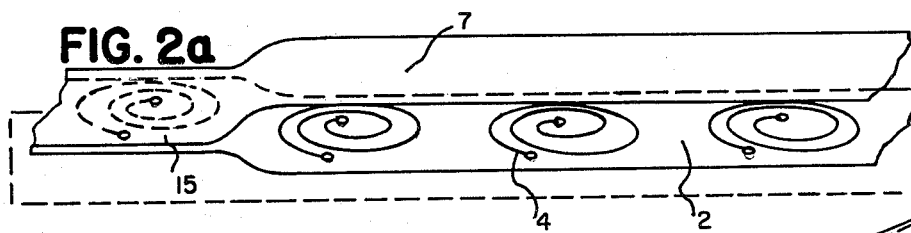
Figure 2B:
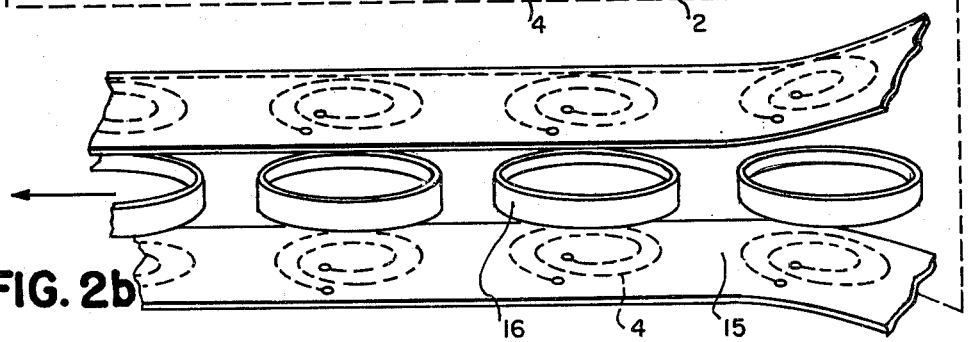
Figure 3A:
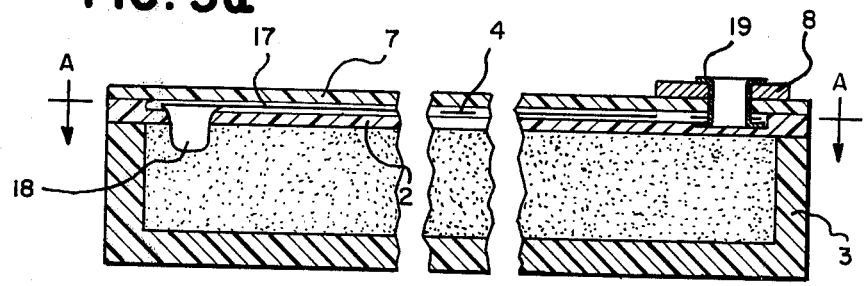
Figure 3B:
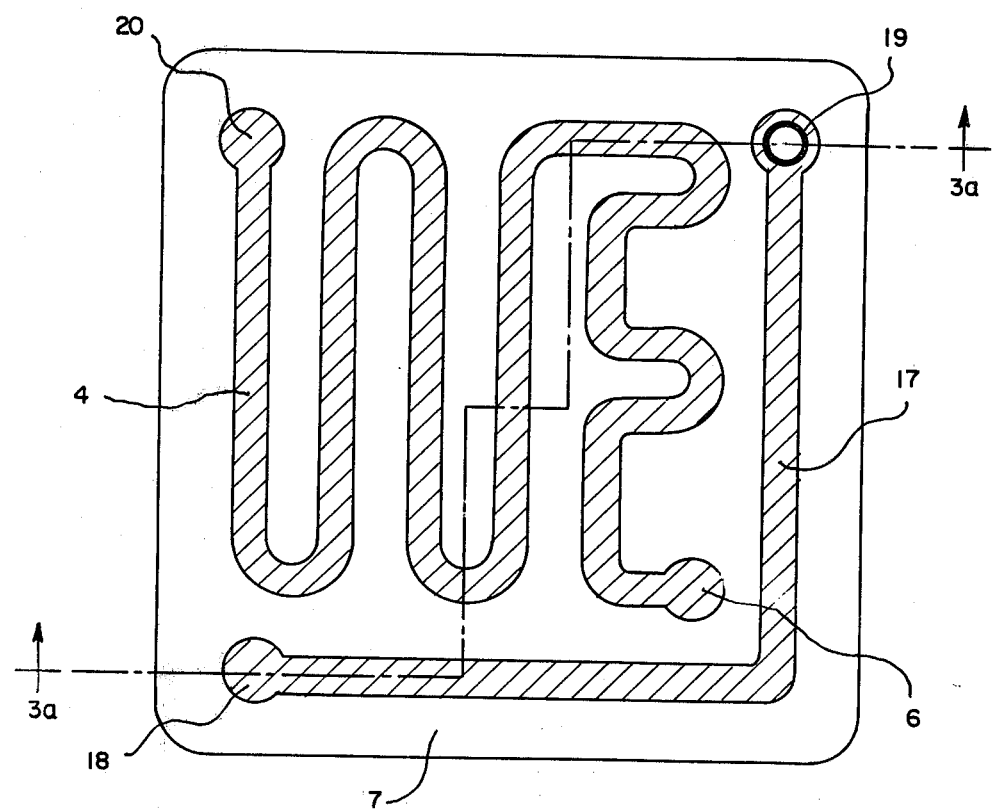

For further details, reference is made to the discussion which follows, in light of the accompanying drawings, wherein FIGS. 1a and 1b shown in cross-sectional and top view, respectively, an embodiment of the present invention;

FIGS. 2a and 2b diagrammatically illustrate a further embodiment of the present invention; and FIGS. 3a and 3b diagrammatically illustrate still further embodiments of the invention.

Referring to FIG. 1a, the cell 1 has as its basic components the lid portion 2 and cup portion 3, both molded of plastic. Both parts are coated on both sides with a conductive metal, e.g. copper, in a layer of 50 to 100$\mu$ thickness, for example. From each outer coating there is etched out a conductive labyrinth path 4, e.g. in the shape of a spiral. From each inner surface, there is etched out a connector plate 5. This is accomplished in a manner analogous to that used in the production of printed circuits. A lead-through 6 respectively connects one end of each take-off conductor spiral 4 with a connector plate 5. By gluing, molding, welding, or pressing cover plates 7 onto the outer surface of the housing components, the conductive spirals 4 are then completely enclosed in the housing wall and the cover plates 7 are provided on their outer faces with metal connector plates 8. The metal connector plates 8 and the connector plates 5 should cover almost entirely the surface of the housing wall. Through apertures 9 in cover plates 7 these are in contact respectively with the opposite ends of the take-off conductor spirals.

After the finished housing portions have been equipped with electrodes (e.g. the cover with zinc powder 10, the cup with an AgO tablet 11) and after a separator 12 with swell sheet 13 and electrolyte (e.g. NaOH) have been introduced, these portions are assembled and ultrasonically welded along their edge region 14.

This produces a structure in which each electrode polarity has two terminal connections, the connector plate 5 as the inner, and the metal connector plate 8 as the outer connector terminal. The housing wall between these connector terminals consists of two layers which are here defined by the bottom of a cup-shaped housing 2, or 3 and the cover plate 7, and in which the conductive path 4 extends in the plane of contact A—A between these two layers.

FIG. 1b illustrates by means of a top view of the plane A—A, the configuration of the spiral conductive path 4.

The same basic structure may be embodied automatically in accordance with the invention in a cell which is machine made in strip form, as appears from FIG. 2. Here a foil strip 2, e.g. as a polyester foil, is first coated with a metal such as copper. From this, there is then etched out a conductive labyrinth path 4 (spiral), by means of an optical process. Instead of producing the conductive labyrinth path indirectly by etching, it can also be applied to the foil strip 2 by vapor deposition through a suitable screen.

By gluing on, or welding on an additional foil strip 7, the conductive laybrinth path 4 is covered, and through-contacts are provided at one end of the labyrinth to the support strip 2, and at the other end of the laybrinth to the cover strip 7. The double strip 15 so produced, which is further provided with external contact plates (not shown), constitutes the prefabricated housing walls (FIG. 2a).

Molded hollow cylinders 16 of plastic, having the desired dimensions of the cell, are then welded or glued at one open end to the double layer 15 filled with the electrochemically active components of the cell, and then closed by a similar double layer with correspondingly positioned labyrinth take-off conductors (FIG. 2b). After stamping out the hollow cylinders and cutting off the edges which extend beyond their edges, these cells are complete. A particular advantage of this method of manufacture is that the upper double layer and lower double layer which are utilized may be independent of cell diameter or cell height. Cell diameter and cell height are determined only by the molded hollow cylinders.

A further desirable embodiment of the invention, in which the outer connector terminals of both positive and negative polarity are located on the same side of the housing, is shown in FIG. 3. In that instance, both electrode take-off conductors are positioned in the same housing portion, for example, in the lid of a flat Ni/Cd storage battery.

For its production, a carrier foil 7 of plastic (FIG. 3a) is metalized on one side, e.g., by rolling on or galvanically depositing copper. From this metal layer, a pair of labyrinth-like conductive paths 4, 17 are etched out. Since the creepage velocity of the electrolyte depends upon the potential, one of these conductive paths may be shorter than the other. The plane A—A of these conductive paths is shown in top view in FIG. 3b.

To the two ends of the conductive paths which are intended for internal connection, there are bonded contacts 6, 18. At the two ends which are intended for external connection, rivet holes are stamped through the foil and into these there are inserted contact rivets 19, 20 with metal connector plates 8. By molding on or gluing on a cover foil 2 of plastic, the lid is completed.

In the associated housing cup 3 of plastic, electrodes with take-off vanes are so positioned that, upon application of the lid, the positive vanes are electrically connected with one and the negative vanes with the other internal contact. Lid and cup are then ultrasonically welded into a sealed housing.

This cell construction is also suitable for continuous manufacture by performing the same steps described above with respect to the foil upon a strip of material to which the housing cups are then attached, and then stamping the cells out of the cover strip after welding.

For a flat cell storage battery according to FIG. 3, having dimensions of 45×40×5 mm, the take-off conductors provide creepage paths of about 17 and 7 cm, respectively.

For a coating thickness of 70$\mu$ of copper, the above-mentioned conductive path length with a conductive path width of 3 mm creates an additional internal resistance of about 30 $\mu\Omega$. For a cell of this size that constitutes a negligibly small increase in resistance.

A general advantage of galvanic elements embodying the invention lies in the achievability of a hermetic cell. Moreover, no tight tolerances need be maintained. The construction technique is suitable for mass production from plastic molded parts and strip materials. Due to the sandwich construction of metal-plastic-metal-plastic-metal, exceptional stability of shape is achieved.

I claim:

1. A galvanic element with tightly sealed housing which contains the electrodes, the separator and the electrolyte and which is provided with connector terminals, said element comprising an internal and an external connector terminal for at least one electrode polarity, and a labyrinth-like conductive path which electrically interconnects the two connector terminals, said path being positioned within insulating material inside the housing wall.

2. The element of claim 1 wherein the housing wall is made of plastic.

3. The element of claim 1 wherein
the housing wall is formed between the internal connector terminal and the external connector terminal of two firmly attached layers in whose contact plane the conductive path is located.

4. The element of claim 1 wherein
the housing is in the shape of a button cell formed by the sealed connection of two housing portions of insulating material.

5. The element of claim 1 wherein
the housing comprises a hollow cylinder which is covered at each of its ends by a cover plate which contains the connector terminals.

6. The element of claim 1 wherein
the housing has the connector terminals of both polarities on a single one of its outer surfaces.

* * * * *